United States Patent [19]

Waggamon

[11] Patent Number: 5,428,923
[45] Date of Patent: Jul. 4, 1995

[54] FAIL SAFE OBSTRUCTION DETECTOR FOR DOOR OPERATORS AND DOOR OPERATOR SYSTEM INCORPORATING SUCH DETECTOR

[75] Inventor: Dennis W. Waggamon, North Canton, Ohio

[73] Assignee: GMI Holdings, Inc., Alliance, Ohio

[21] Appl. No.: 111,154

[22] Filed: Aug. 24, 1993

Related U.S. Application Data

[63] Continuation-in-part of Ser. No. 921,457, Jul. 28, 1992, abandoned, which is a continuation of Ser. No. 660,042, Feb. 25, 1991, abandoned.

[51] Int. Cl.[6] .................... E05F 15/00; G08B 21/00; G01V 9/04
[52] U.S. Cl. .......................... 49/28; 49/25; 340/650; 340/652; 250/222.1
[58] Field of Search .............. 49/25, 26, 27, 28, 31; 318/468, 469, 286, 266; 340/555, 556, 557, 650, 652; 250/221, 222.1

[56] References Cited

U.S. PATENT DOCUMENTS

| | | | |
|---|---|---|---|
| 2,909,718 | 10/1959 | Lawick | 49/25 X |
| 3,742,222 | 6/1973 | Endl . | |
| 3,783,556 | 1/1974 | Cook | 49/25 |
| 3,973,184 | 8/1976 | Raber | 340/650 X |
| 4,009,375 | 2/1977 | White et al. | 235/150.24 |
| 4,266,124 | 5/1981 | Weber et al. | 250/221 |
| 4,274,226 | 6/1981 | Evans | 49/25 |
| 4,325,146 | 4/1982 | Lennington | 455/604 |
| 4,621,452 | 11/1986 | Deeg | 49/28 |
| 4,766,516 | 8/1988 | Ozdemir et al. | 361/380 |
| 4,782,300 | 11/1988 | Bonaccio et al. | 340/650 X |
| 4,815,106 | 3/1989 | Propp et al. | 375/36 |
| 4,914,859 | 4/1990 | Gionet et al. | 49/25 |
| 4,922,168 | 5/1990 | Waggamon et al. | 318/286 |
| 4,953,608 | 9/1990 | Larsson | 49/28 X |
| 4,967,083 | 10/1990 | Kornbrekke et al. | 49/25 X |
| 4,969,038 | 11/1990 | Lemelson | 358/107 |
| 4,973,837 | 11/1990 | Bradbeer | 250/221 |
| 4,980,618 | 12/1990 | Milnes et al. | 318/265 |
| 5,025,344 | 6/1991 | Maly et al. | 340/650 X |
| 5,191,268 | 3/1993 | Duhame | 318/266 |
| 5,285,136 | 2/1994 | Duhame | 318/266 |

FOREIGN PATENT DOCUMENTS

9006605 U 9/1990 Germany .
18999 10/1992 WIPO .

*Primary Examiner*—Peter M. Cuomo
*Assistant Examiner*—Jerry Redman
*Attorney, Agent, or Firm*—Beveridge, DeGrandi, Weilacher & Young

[57] ABSTRACT

The light beam in an obstruction detector is coded into packets of pulses by a transmitter according to a code generated only by the transmitter. When the light beam is received, the receiver recovers the code signal and supplies it to a code detection circuit. In one preferred embodiment, to detect the code, the code detection circuit supplies the code signal and a delayed version of the code signal to an "exclusive or" gate. In another embodiment, a frequency detection circuit determines whether the code signal detected by the receiver is within a predetermined permissible range. If the code is not present, the door operator system reverses the door if it is closing, and prevents the door from closing if it already is in the up position, or if it is opening. The door operator system will operate in this way not only in response to obstructions, but also, in response to errors and malfunctions in the wiring to the transmitter and receiver, and in the transmitter and receiver themselves.

20 Claims, 13 Drawing Sheets

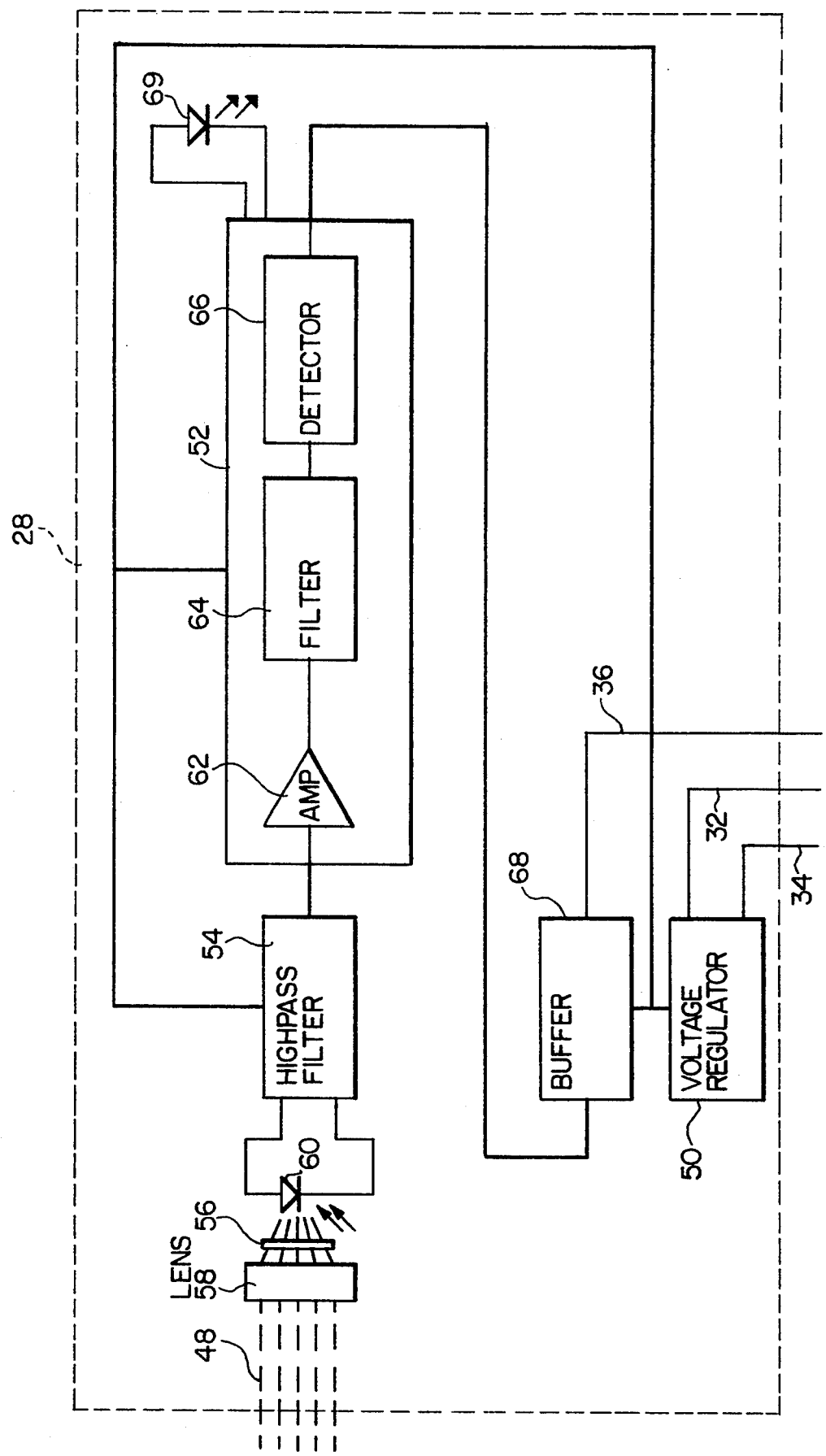

FAIL SAFE OBSTRUCTION DETECTOR FOR DOOR OPERATORS AND DOOR OPERATOR SYSTEM INCORPORATING SUCH DETECTOR

This application is a continuation-in-part of U.S. application Ser. No. 07/921,457 filed on Jul. 28, 1992, now abandoned which is a continuation of U.S. application Ser. No. 07/660,042 filed on Feb. 25, 1991, now abandoned.

BACKGROUND OF THE INVENTION

1. Field of the Invention

This invention relates to automatic door operators and, more particularly, to door operators having obstruction detectors.

2. Description of the Prior Art

There have been various types of obstruction detectors for use in garage door operators. The oldest system consisted of a torque sensor in the motor of the door operator itself. If the sensor detected excess torque, such as caused by the door attempting to close upon something that was in its path, the door stopped and reversed.

There has recently been increased attention paid to garage door operator safety. Federal legislation has been passed, as well as legislation in several states, including Minnesota and California. The purpose of this legislation is to provide additional safety features to residential garage door operators beyond the traditional torque sensors. The California law requires the inclusion of a tactile garage door edge sensor, an optical sensor or similar device that, when activated, is designed to cause a closing door to open and prevent an open door from closing.

Edge sensors and optical or light beam sensors are two of the more popular obstruction detectors currently being used. Edge sensors are commonly used in elevator doors and also are designed specifically for use on the bottom edge of garage doors. An edge sensor device typically comprises a strip placed along the leading edge of the door providing a multiplicity of parallel open switches spaced along the door edge. When pressure is applied to any spot on the strip, one or more of the switches closes, producing a closed-circuit. Edge sensors thus provide an open-circuit when no obstruction is sensed and provide a closed-circuit when an obstruction contacts the sensor.

Light beam sensors recently have become popular. These systems typically include an infrared light emitter positioned on one side of the garage doorway and an infrared sensor on the other side. The emitter produces a light beam that is aligned so that it extends across the doorway and strikes the sensor on the other side. As long as the sensor detects the light beam, the sensor outputs a low-level signal. When the light beam is broken and the sensor does not detect the presence of the light beam, the sensor outputs a high-level signal indicating the presence of an obstruction in the doorway.

These obstruction detectors can be connected to the door operator by three lines, a supply line, a signal line and a ground line. The supply line typically supplies 20 to 30 volts from the power supply of the door operator to the remote obstruction detector. The signal line provides a signal from the obstruction detector to the door operator. The ground line supplies a reference signal from the door operator to the remote detection device. The voltage on the signal line is close to the supply voltage when the obstruction sensing device senses an obstruction and is close to ground when no obstruction is sensed.

As long as the door operator receives a low-level output signal from the obstruction detector on the signal line, the operator operates normally, opening and closing the door. When a high-level output signal is received from the obstruction detector, the signal is an indication that an obstruction has been detected, and the door operator stops the door if it is closing and reverses it. (If the door is already going up when an obstruction is detected, the operator continues opening the door.) As long as an obstruction continues to be sensed, the operator will not permit the door to close.

These existing obstruction detectors are generally very effective in sensing an obstruction and the door operator takes the appropriate action in response. However, the obstruction detectors are only effective as long as they work and as long as the wiring from the door operator to the detector is operating properly.

While the wiring within the door operator/control circuit is usually well protected (and correctly wired), obstruction detection usually requires that the obstruction detector be located near the floor or the bottom of the door, remote from the detector. This exposes the detector wiring to physical hazards and potential wiring errors. If one of the wires from the obstruction detector to the door operator breaks or is damaged or if the wires short out, the signal from the obstruction detector will be unreliable. If certain wires short or open, the system will produce a high-level signal which will cause the door operator to keep the door open. However, if certain other conditions occur, it is possible for the door operator to continue to receive a low-level signal from the obstruction detector even though there is an obstruction in the doorway.

For example, if the supply line and the signal line short together, a high-level signal will be present on the signal line regardless of the presence of an obstruction. If the signal line and the ground line short together, a low-level signal will always be present on the signal line regardless of the presence of an obstruction. If the supply line or the signal line is damaged creating an opening-circuit on either line, a low-level signal will always be present on the signal line regardless of the presence of an obstruction. Similarly, if the ground line is damaged creating an open-circuit on that line, a high-level signal will always be present on the signal line regardless of the presence of an obstruction.

Also, if the obstruction detector itself malfunctions, a continuous high-level or low-level signal may be present on the signal line regardless of the presence of an obstruction. While a false indication of an obstruction would merely result in the operator refusing to close the door, a false indication of the absence of an obstruction could result in the operator allowing the door to erroneously close.

SUMMARY OF THE INVENTION

The present invention overcomes the potential problems inherent in the prior art. It provides a door operator system that causes the door operator to place the door in a safe position when an obstruction is detected and also when there is an error or fault in the obstruction detector or the wiring connecting the obstruction detector to the door operator.

The present invention provides a door operator system having a control circuit for controlling the opening and closing of the door across a threshold, a coded wave transmitter for providing a coded wave and a wave receiver for providing a coded control signal in response to receipt of the coded wave. The presence of an obstruction in the door threshold prevents the receipt of the wave. A control signal detector provides an "unsafe" signal to the control circuit if no coded signal is detected.

In the preferred embodiments, the transmitter generates a relatively high frequency signal and a relatively low frequency signal. The transmitter combines these signals and transmits the composite signal as its coded wave. The receiver detects the relatively low frequency signal in the composite signal from the transmitter and applies the low frequency signal to a signal detector of the control circuit as a coded control signal which represents safe conditions, i.e., no obstruction and no error in the obstruction detector or wiring. The receiver has no internal source to generate this representative low frequency signal and so if either the transmitter or the receiver fails, or the system wiring becomes faulty, there is no means to provide the low frequency signal to the signal detector.

In normal operation, receipt of the coded wave results in a coded control signal in response to which the control signal detector provides a "safe" signal to the control circuit. If an uncoded control signal is detected, either an obstruction exits, or an error or malfunction has occurred in the transmitter, the receiver, or the wiring connecting them to the control signal detector. As a result, the control signal detector provides an "unsafe" signal to the control circuit.

The present invention may be practiced with various obstruction detectors. Besides optical waves, radio waves and sound waves may be used. In addition, a mechanical obstruction detector such as an edge detector with series-wired normally-closed switches could be used.

BRIEF DESCRIPTION OF THE DRAWINGS

FIG. 3 is a block diagram of the light receiver of FIG. 1.

DESCRIPTION OF THE PREFERRED EMBODIMENTS

Figure 1:
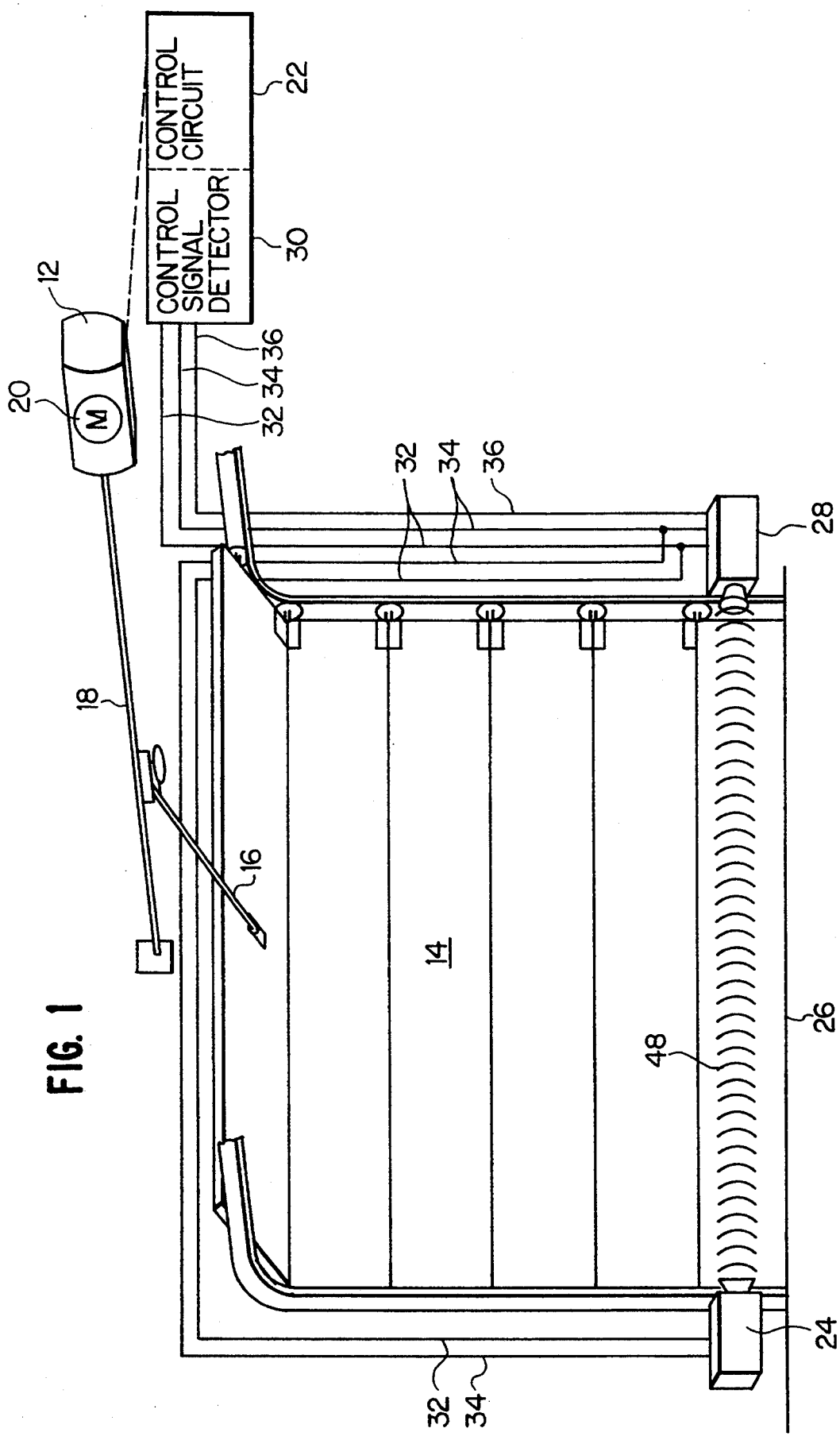
FIG. 1 is a partially perspective and partially schematic view of a door operator system according to the invention.

Referring to FIG. 1, a door operator 12 is connected to a door 14 by an arm 16. The arm 16 is driven along a track 18 by an electric motor 20, resulting in the door 14 either opening or closing, depending the direction of travel of the arm 16.

A control circuit 22 determines the direction of travel, if any, of the arm 16.

A coded light transmitter 24 is located at one side of the door 14, near the threshold 26. A light receiver 28 is located at the opposite side of the door 14, near the threshold 26.

The transmitter 24 and the receiver 28 are connected to a control signal detector 30 by a supply wire 32, and a ground wire 34. In addition, the receiver 28 is connected to the control signal detector 30 by a control signal wire 36.

The control circuit 22 and the control circuit detector 30 are both located remotely from the threshold 26. The control signal detector 30 may be advantageously housed commonly with the control circuit 22 or located close by.

In the preferred embodiment, the transmitter 24, the receiver 28 and the control signal detector 30, all receive power from the control circuit 22 which may supply, for example 24 volts d.c. The transmitter 24 and the receiver 28 are supplied with power by the wires 32, 34.

Figure 2:
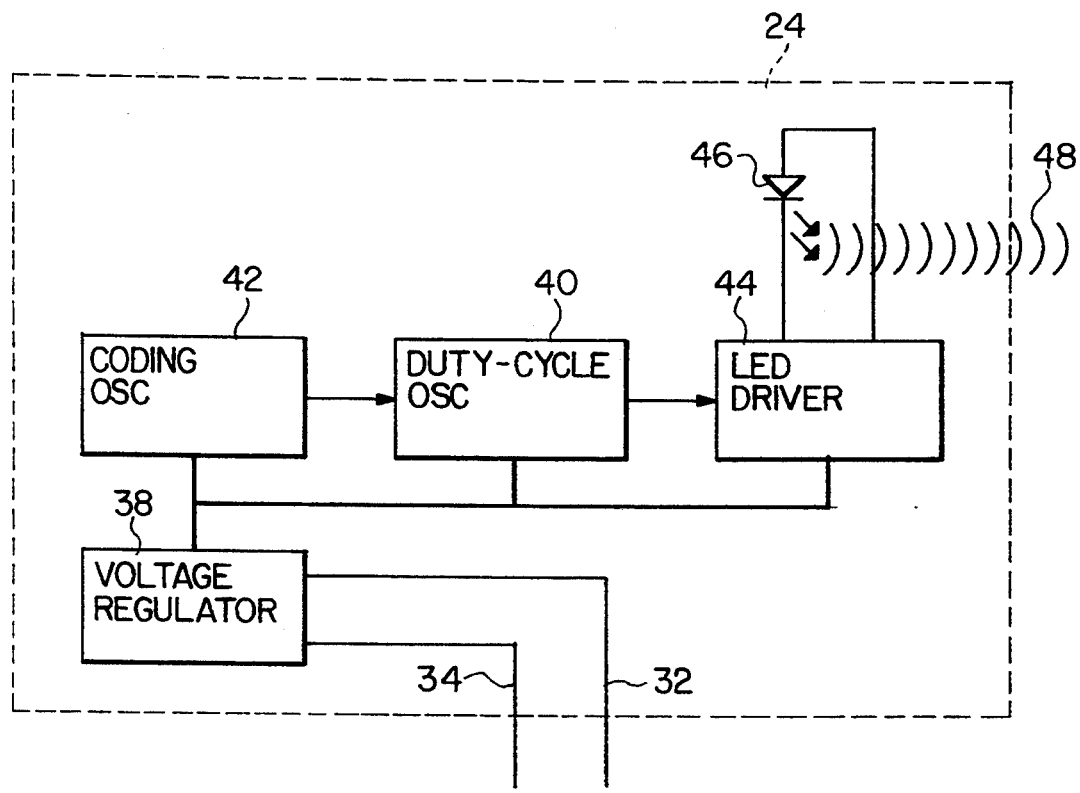
FIG. 2 is block diagram of the coded light transmitter of FIG. 1.

Referring to FIG. 2, the transmitter 24 includes a voltage regulator 38 connected to the supply wire 32 and the ground wire 34. The regulator 38 provides regulated power (e.g. 12 volts d.c.) to power a duty-cycle oscillator 40, a coding oscillator 42 and an LED driver 44.

The coding oscillator 42 provides a gating signal to the duty-cycle oscillator 40. The duty-cycle oscillator 40 provides a high frequency (e.g., 10 kHz) pulse train gated by the gating signal to the LED driver 44. The LED driver 44 in turn drives an infrared LED 46 to supply the coded light beam 48 (see FIG. 1).

The duty cycle of the pulses from the duty-cycle oscillator 40 is chosen to allow maintenance of sufficient intensity of the coded light beam 48 to overcome ambient light while keeping the LED driver 44 power dissipation below safe levels. For example, a duty cycle of 25% may be used. The high frequency of the pulses facilitates the reception of the coded light beam 48.

The frequency and duty cycle of the coding oscillator 42 is chosen to provide a suitable code for the coded light beam 48. For example, a frequency of 50 Hz and a 50% duty cycle may be used. This results in the coded light beam 48 being made up of 10 millisecond packets of 10 kHz light pulses followed by 10 milliseconds of no pulses, repeating 50 times per second.

Referring to FIG. 3, the receiver 28 includes a voltage regulator 50 connected to the supply wire 32 and the ground wire 34. The regulator 50 provides regulated power (e.g. 12 volts d.c.) to power a buffer 68, an integrated-circuit detector 52 and a high pass filter 54.

The coded light beam 48 is focused by a lens 58 on an infrared photodiode 60. The coded light beam passes through an infrared filter 56 that blocks the majority of ambient light (non-infrared), before contacting photodiode 60.

The high pass filter 54 is chosen so that the desired signal (e.g. 10 kHz) will be passed, while most ambient light produced voltage (which has very little high frequency content) is blocked.

The signal from the high pass filter 54 passes to the integrated-circuit detector 52. The integrated-circuit detector 52 contains an amplifier 62, a filter 64 and a detector 66 optimized to detect the envelope of a high frequency pulse train (e.g. a 10 kHz pulse train) and provide the envelope as an output, which in the present example would be a 50 Hz square wave.

The output of the integrated-circuit detector 52 passes to the input of a buffer 68 where it is buffered and provided as a control signal on the control signal wire 36.

The output of the integrated-circuit detector 52 provides a visual indication that it is receiving the coded light beam 48 by energizing a visible light LED 69.

Figure 4:
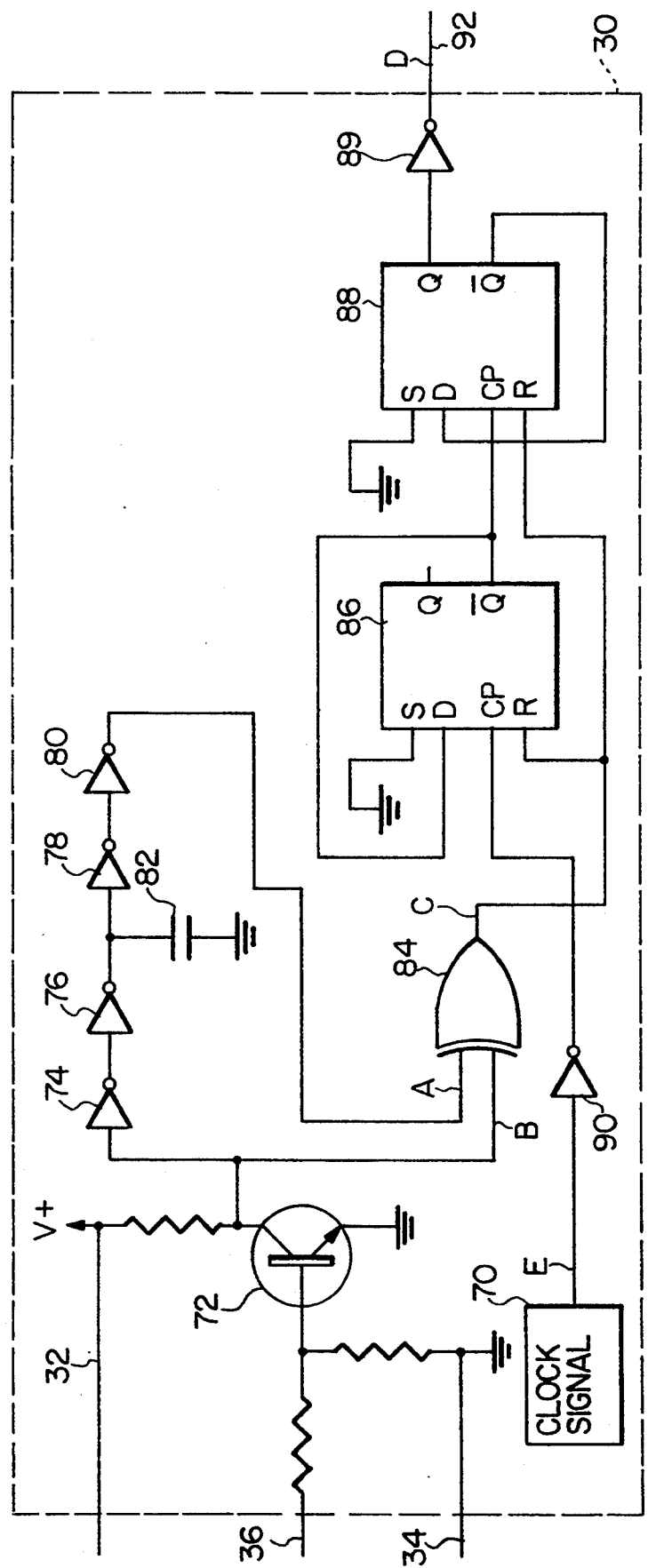
FIG. 4 is a schematic diagram of the control signal detector of FIG. 1.

Referring to FIG. 4., the control signal detector 30 is provided with a voltage V which may be advantageously obtained from the control circuit 22 (see FIG. 1). A clock signal 70 (e.g. 60 Hz) may be obtained also from the control circuit 22 or generated locally.

The control signal from the control signal wire 36 is buffered by the npn-transistor 72. The buffered control signal is applied to a delay circuit composed in this example of a series of inverters 74, 76, 78, 80 and a capacitor 82 connected between the inverters 76, 78 to ground, producing a delayed version of the control signal at the output of the inverter 80. The buffered control signal and the delayed control signal are applied to respective inputs of an "exclusive or" gate 84.

The output of the "exclusive or" gate 84 is applied to the reset inputs "R" of a pair of flip-flops 86, 88.

The clock signal 70 is inverted by an inverter 90 and applied to the clock pulse input "CP" of the flip-flop 86.

The inverted output "$\overline{Q}$" of the flip-flop 86 is applied to the "D" input of the flip-flop 86 and to the clock pulse input "CP" of the flip-flop 88.

The inverted output "$\overline{Q}$" of the flip-flop 88 is applied to the "D" input of the flip-flop 88.

The set terminals "S" of both flip-flops 86, 88 are connected to ground.

The output "Q" of the flip-flop 88 is inverted by an inverter 89 to provide a "safe"/"unsafe" signal 92 to the control circuit 22.

The flip-flops 86, 88 are thus configured so that a high value from the gate 84 will reset them, resulting in a high output for the "safe"/"unsafe" signal 92. On the other hand, a lower value from the gate 84 will result in clock pulses from the clock signal 70 rippling down through the flip-flops 86, 88, thus providing a pulse train output for the "safe"/"unsafe" signal 92.

In normal operation, the transmitter 24 transmits the coded light beam 48 composed of packets of light pulses towards the receiver 28.

If no obstruction prevents the coded light beam 48 from reaching the receiver 28, the receiver 28 detects the envelope of the coded light beam 48 and provides the resulting coded control signal in the form of a square wave to the control signal detector 30 via the control signal wire 36.

Figure 5A:
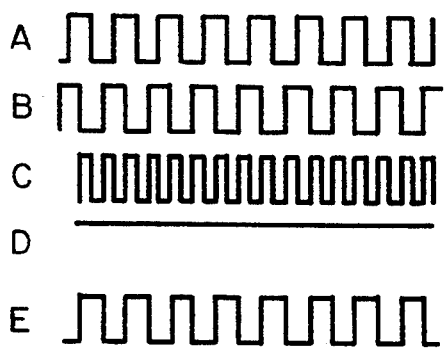
FIG. 5a is an exemplary graph showing the interrelationship between the signals at indicated points in FIG. 4 when coded light is being received.

The control signal and a delayed version of the control signal are applied to the "exclusive or" gate 84. The output of the gate 84 for these square wave inputs is a pulsed wave, the pulse duration being equal to the delay between the control signal and the delayed version of the control signal. This is shown in FIG. 5a for signal C, the output of the gate 84, (signal B being the control signal and signal A being the delayed control signal). The output of the gate 84 continuously resets the flip-flops 86, 88 before the clock signal 70 (signal E) can ripple through the flip-flops 86, 88. As a result, the "safe"/"unsafe" signal 92 stays high (signal D), thus providing the control circuit 22 with a "safe" signal.

In response to "safe" signals, the control circuit 22 operates to raise and lower the door upon command.

If an obstruction prevents the coded light beam 48 from reaching the receiver 28, a control signal without coding is provided by the receiver 28 to the control signal detector 30.

Figure 5B:
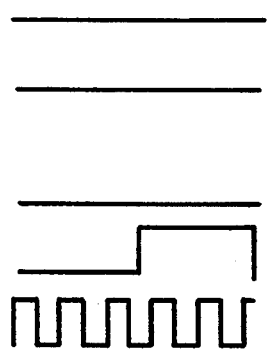
FIG. 5b is an exemplary graph showing the interrelationship between the signals at indicated points in FIG. 4 when coded light is not being received or various error conditions exist.

Without the coding, the control signal is essentially constant with respect the clock signal 70. As shown in FIG. 5b, the control signal B and the delayed control signal A are the same, thus the output of the gate 84 is a constant low value (signal C). This constant output of the gate 84 does not reset the flip-flops 86, 88. As a result, the clock signal 70 (signal E) ripples through the flip-flops 86, 88 providing a pulse train output (signal D) for the "safe"/"unsafe" signal 92, thus providing the control circuit 22 with an "unsafe" signal.

In response to "unsafe" signals, the control circuit 22 reverses the door 14 if it is closing, continues opening the door 14 if it is opening, and prevents the door 14 from closing if it is up.

In addition, the present invention, if the signal wire 36 becomes disconnected or shorted to ground, the signals will also appear as in FIG. 5b.

Figure 5C:
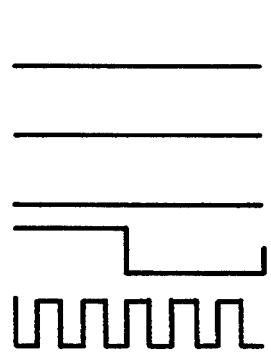
FIG. 5c is an exemplary graph showing the interrelationship between the signals at indicated points in FIG. 4 when various other error conditions exist.

Similarly, if the signal wire 36 is shorted to the supply voltage (through a short to the supply wire 32 or some other malfunction), the signals will appear as in FIG. 5c, where the output of the gate 84 (signal C) is still low and thus the control circuit 22 will receive an "unsafe" signal.

Also, since the receiver 28 has no internal source for the coded control signal (all coding being provided by the transmitter 24), if the receiver 28 fails, its output can not be the coded control signal and hence either the case of FIG. 5b or FIG. 5c will result and an "unsafe" signal will be sent to the control circuit.

In the embodiment of FIG. 1, fail safe operation is achieved because only transmitter 24 can generate the intelligence coding. In the example used, transmitter 24 generates the 10 kHz signal which is encoded with intelligence by gating the 10 kHz pulse train to alternately provide a 10 millisecond time duration during which the 10 kHz pulses are optically transmitted, followed by a 10 millisecond duration during which no 10 kHz pulses are optically transmitted. Coding oscillator 42 applies the intelligence to the 10 kHz pulse train by generating a 50 Hz signal which alternatively enables and suppresses transmission of the pulse train at every 10 millisecond interval. The intelligence code is to be detected by integrated-circuit detector 52 when detector 66 detects the alternating 10 millisecond transmission and nontransmission durations in order to extract the low frequency, 50 Hz square wave.

Buffer 68 does not change the extracted 50 Hz square wave, and as such, it is applied directly to buffer transistor 72. Hence, receiver 28 actually applies the detected 50 Hz intelligence signal generated by the transmitter 24 as the control signal on wire 36 to represent that no obstruction has been detected. Receiver 28 has no internal source for producing either the 50 Hz intelligence code, or the 10 kHz pulse train. These signals originate at the transmitter, and therefore the 50 Hz code is received by detector 30 only during normal operation, without obstructions or faults. Detector 30, in effect, determines whether the frequency of the signal from receiver 28 exceeds a minimum frequency required to prevent the clock signal 70 from rippling through flip-flops 86 and 88. Detector 30 thus provides the control circuit with means to cause reversal of the door 14 if it is closing, and to prevent the door from closing if it is up, or if it is opening.

Figure 6:
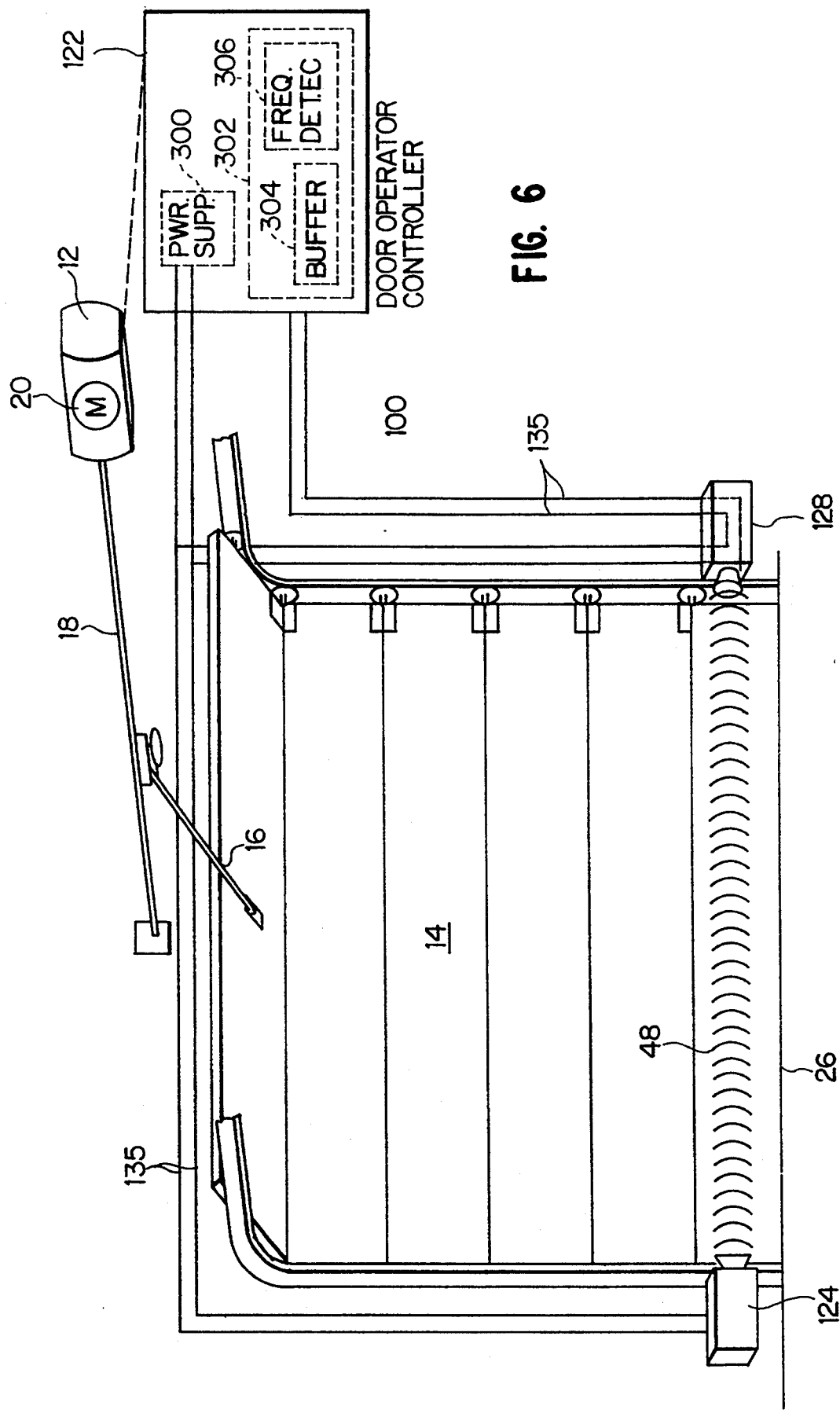
FIG. 6 is a view, similar to FIG. 1, of an alternative embodiment of a door operator system according to the invention.

FIG. 6 shows an alternative embodiment of a door operator system in accordance with the present invention. Door operator system 100, like the system of FIG. 1, includes an infrared transmitter 124 and an infrared receiver 128 positioned on either side of a protected threshold 26. Transmitter 124 and receiver 128 are connected to a door operator controller 122 which is contemplated to control all aspects of door operation by controlling motor 20.

A first apparent difference between operator system 100 and the door operator system of FIG. 1 is the connection between door operator controller 122, and transmitter 124 and receiver 128. In this preferred embodiment, the connections between the door operator controller 122 and the transmitter 124 and receiver 128 are made by a two wire network 135. In this arrangement, the two wire network 135 transmits both power and data among the controller 122, the transmitter 124 and the receiver 128. The two wire network 135 is a conventional way of utilizing two lines to provide both power and data.

Figure 7:
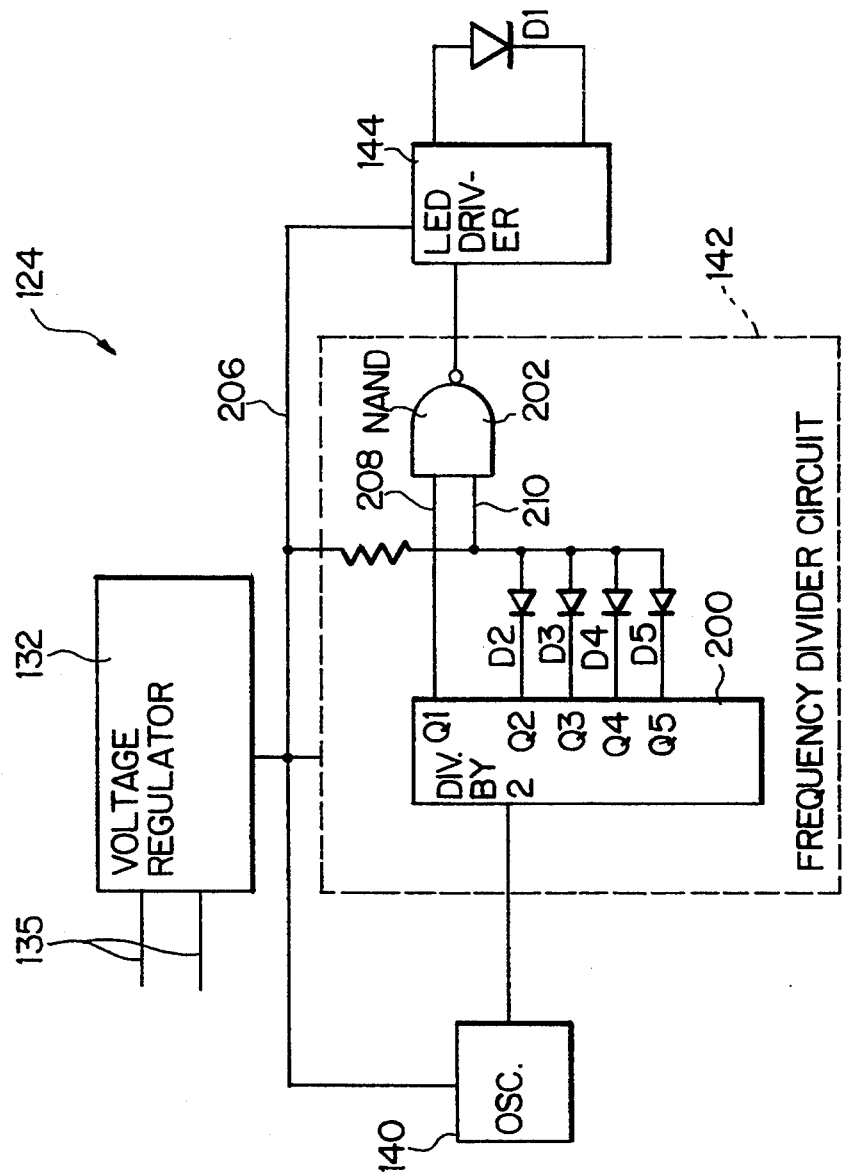
FIG. 7 is a partial block diagram of an optical transmitter of the system of FIG. 6.

FIG. 7 shows preferred transmitter 124 in more detail. Transmitter 124 receives power over two wire network 135 through its voltage regulator 132. Voltage regulator 132 in turn applies operating power for an oscillator 140, a frequency divider circuit 142, and a LED driver 144.

In this preferred embodiment, transmitter 124 generates two repetitive signals and combines them for transmission. In a preferred implementation, oscillator 140 generates a 96 kHz clock signal which it applies to frequency divider circuit 142. Frequency divider circuit 142 includes a frequency divider 200 which receives the 96 kHz signal from oscillator 140. A first output Q1 is connected to an input 208 of a NAND gate 202. When a 96 kHz signal is applied to the input of frequency divider 200, a 48 kHz signal appears at output Q1. Outputs Q2, Q3, Q4 and Q5 apply 3,000 Hz, 1500 Hz, 750 Hz, and 375 Hz pulse trains to corresponding diodes D2, D3, D4, and D5. Diodes D2 through D5 are thus connected between a voltage line 206 and the frequency divider 200 in an "AND" configuration. Periodically, all of outputs Q2, Q3, Q4, and Q5 will go high whereby these outputs will simultaneously reverse bias all of diodes D2 through D5 to repetitively apply pulses to the second input 210 of NAND gate 202, which thus goes high for the duration of each such pulse. In this preferred implementation, the pulses applied to NAND gate input 210 occur at a frequency of 375 Hz with a duty cycle having a typical high time of about 167 microseconds and a typical low time of about 2.49 milliseconds. This 375 Hz, 167 microsecond signal is detectable by receiver 128 and constitutes the detectable code or intelligence signal for the door operator control system 100.

As in the embodiment of FIG. 1, the 375 Hz intelligence signal (and the 48 kHz signal) is generated only by the transmitter 124, from which it is optically transmitted to receiver 128. Receiver 128 in turn, detects and passes the 375 Hz signal on to door operator controller 122 to represent that there is no obstruction at the threshold 26. At NAND gate 202, the 375 Hz intelligence signal combines with the higher frequency output from frequency divider output Q1 to encode the 48 kHz signal with the 375 Hz intelligence. The composite signal is applied to LED driver 144 which drives LED D1 accordingly to optically transmit the encoded composite signal across the protected threshold 26.

Figure 8:
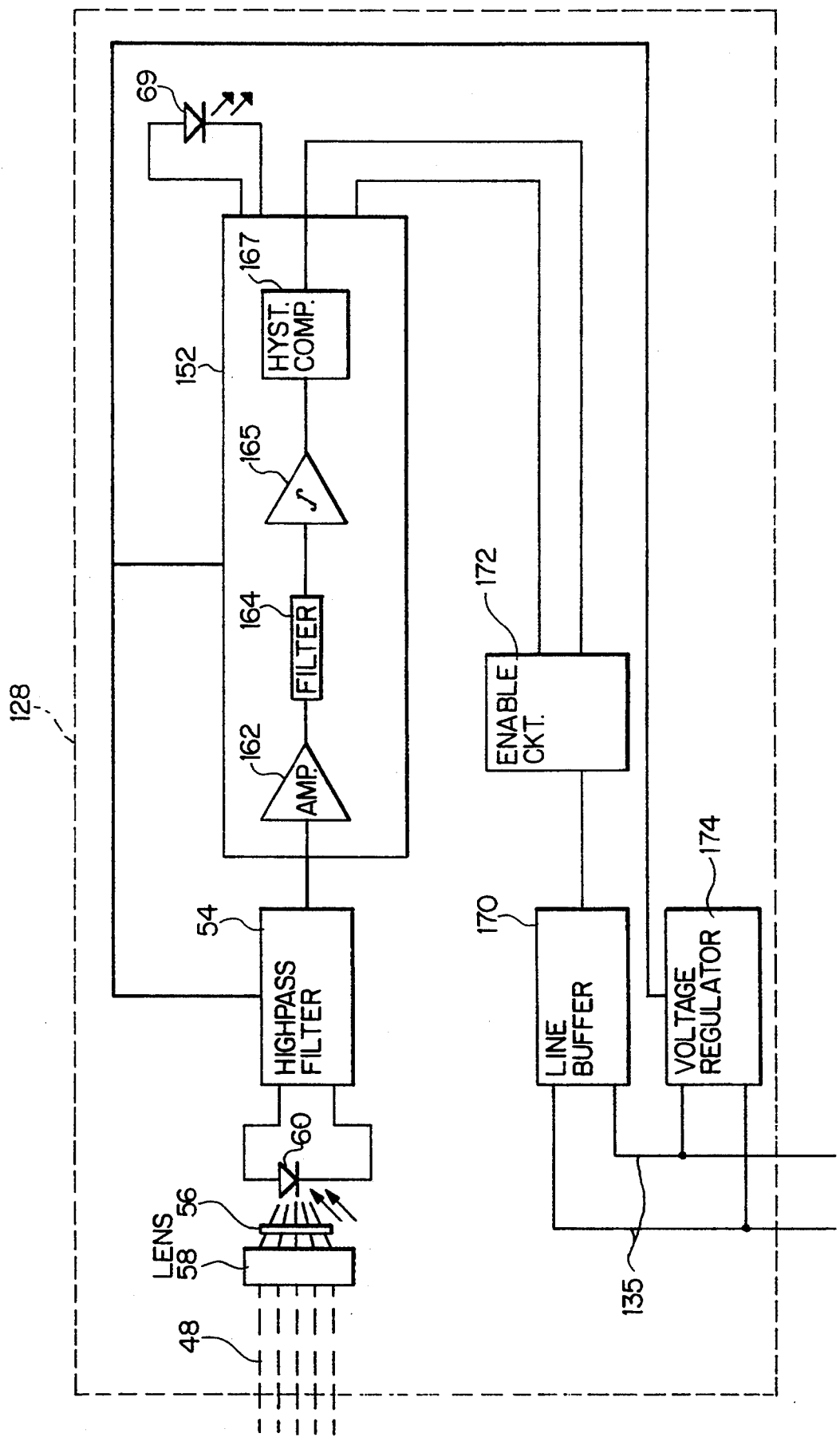
FIG. 8 is a block diagram of a receiver of the system of FIG. 6.

Receiver 128 is shown in detail in FIG. 8. Receiver 128 is seen to be similar to receiver 28 in many respects. Receiver 128 differs primarily due to its connection to the two wire cable 135 for applying the detected intelligence signal to door operator controller 122. A voltage regulator 174 for providing power to the elements of receiver 128 also is connected to lines 135.

Preferred receiver 128 also comprises an integrated-circuit detector 152. A suitable detector for use in receiver 128 is a preamplifier for IR remote control produced by Sony Corp. (TM), known as Sony CX20106A. Preferred detector 152 includes an amplifier circuit 162, a bandpass filter 164, an integrator 165, and a hysteresis comparator 167. The bandpass filter 164 is selected to prevent all but the encoded composite signal to pass to the integrator 165. Integrator 165 performs detection by filtering out the 48 kHz signal in order to extract the 375 Hz intelligence signal produced by the "AND" configuration of diodes D2, D3, D4, and D5 and frequency divider 200. Hysteresis comparator 167 acts as a pulse shaping circuit which provides clean edges for the data signal detected by integrator 165.

Output from comparator 167 is applied directly to a line buffer 170 connected to the two wire network 135. Line buffer 170 could comprise a single transistor with its base connected to receive the output from detector 152. Driver 170 varies the voltage on lines 135 according to the frequency and duty cycle of the 375 Hz intelligence signal to represent proper receipt of the transmitter signal. In this way, as long as receiver 128 receives and detects the 375 Hz, 167 microsecond intelligence signal from transmitter 124, the receiver applies the detected intelligence signal to door operator controller 122 over the two wire cable 135. As with integrated-circuit detector 52 of the first embodiment, output from detector 152 of system 100 also is applied to an LED 69 to provide a visual indication that the transmitter signal is being continuously received.

Receiver 128 further is shown to include an enabling circuit 172 connected between detector 152 and line driver 170. Circuit 172 is optional and is contemplated for faster response. In the event that detector 152 does not detect the 375 Hz, 167 microsecond signal, either due to obstruction or equipment failure e.g. transmitter failure, detector 152 causes disabling circuit 172 to instantly disable line driver 170. This condition remains until detection of the transmitter signal resumes.

Figure 9:
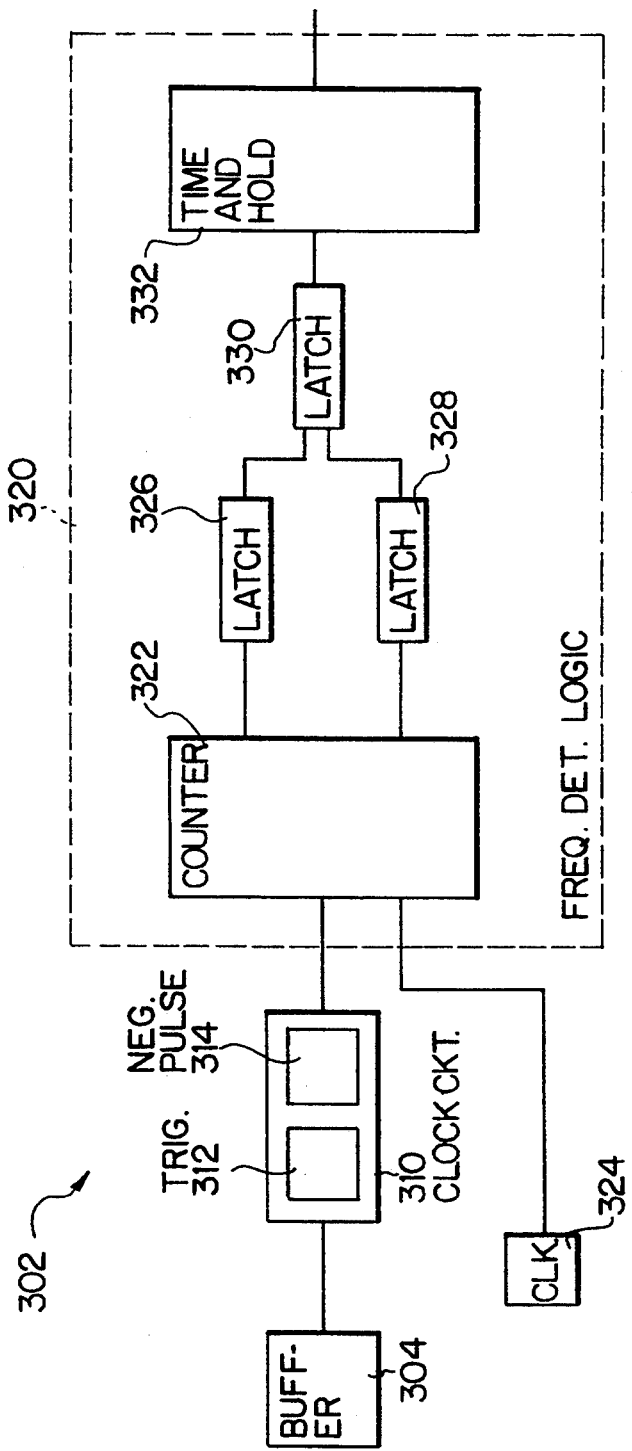
FIG. 9 is a block diagram which more particularly shows frequency detection elements in the door operator controller of the system of FIG. 6.

With reference to FIGS. 6 and 9, controller 122 includes an internal power regulator 300 and a frequency detection circuit 302. The power regulator circuit 300 is contemplated as receiving commercial power over the house line and rectifying it to provide DC power to the various elements of system 100 over lines 135. Frequency detection circuit 302 is seen to include a buffer 304 and a frequency detector 306. Buffer 304 is contemplated as comprising an inverting transistor which buffers the signal from receiver 128 before it is applied to the frequency detector 306. In an implemented embodiment, door operator controller 122 comprises an integrated circuit which contains the frequency detector 306 in addition to most other circuit elements for controlling the door motor 20.

FIG. 9 shows the frequency detection circuit 302 in more detail in block diagram form. Buffer 304 applies the detected intelligence or data signal to a clock circuit 310 which includes a Schmitt trigger circuit 312 and a negative pulse producing circuit 314. In the preferred embodiments, clock generator 310 functions to provide a narrow negative going pulse in response to each positive going pulse applied thereto from buffer 304. There is a one-to-one correspondence between each 375 Hz pulse from receiver 128 and each narrowed pulse provided by clock circuit 310. This arrangement is for input signal conditioning.

Output from clock circuit 310 is applied to frequency detection logic 320. This logic circuit 320 determines whether or not the input frequency is between a predetermined range. In this example where the intelligence or data signal is 375 Hz, the preferred frequency range is from about 240 Hz to about 660 Hz. Frequency detection logic 320 differs from the detector 30 of the FIG. 1 embodiment in providing only two outputs. When the frequency applied to logic circuit 320 is within the required range, the logic provides a logical "1" which means that the transmitter signal has been received reliably. An input frequency outside of the required range will result in a logical "0" output from logic 320 whereby the door operator controller 122 controls the door in a manner consistent with detection of an obstruction.

In an implemented embodiment, detection logic 320 includes a counter 322 which receives the conditioned signal from clock circuit 310, and a 60 Hz clock signal from a 60 Hz clock 324. Any conventional counter and clock circuit can be used. The 60 Hz clock signal resets the counter 322 every 16.7 milliseconds. Counter 322 provides outputs to a "VALID" latch 326 and an "INVALID" latch 328, depending on its count at the time of arrival of a next reset pulse. If the count value is more than four and less than eleven, counter 322 sets VALID latch 326. When latch 326 has been set, an error latch 330 is held reset. This provides a logical "1" to timer and hold circuit 332 which holds the high output for a desired duration. If the count is outside of the allowable range, then INVALID latch 328 is set whereby ERROR latch 330 also is set. When latch 330 is set a logical "0" is provided and held by the timer and hold circuit 332.

In normal operation, receiver 128 provides the detected 375 Hz signal to clock circuit 310, which applies a corresponding, shortened-pulse train to logic 320. If detection logic 320 determines that the 375 Hz signal falls within the allowable range, it provides a logical "1" output whereby the controller 122 operates the door normally. If the transmitter signal is blocked by an obstruction, or if the transmitter becomes nonoperative, receiver 128 applies an essentially constant signal to frequency detector 306. If receiver 128 becomes faulty, it cannot erroneously provide the 375 Hz signal to frequency detector 306 since the receiver does not have signal generation capability. If wires 135 become disconnected or shorted, frequency detector 306 likewise will receive a signal outside of the required range, most likely, a constant signal which it will interpret as indicative of an obstruction. Hence, in the case of obstruction or fault in the transmitter 124, receiver 128 or the system wiring 135, the signal which will be evaluated at the door controller 122 will be distinctly different from the 375 Hz transmitter-generated signal which the receiver detects and passes to the door controller to represent safe conditions at the threshold 26.

FIGS. 10 through 13 are circuit diagrams showing particulars of transmitter 124, receiver 128, clock circuit 310, and frequency detection logic 320 as these elements have been applied in an implemented embodiment. Broken-lines have been used to indicate component groups which make up the elements shown in block diagrammic form in FIGS. 7 through 9.

Figure 10:
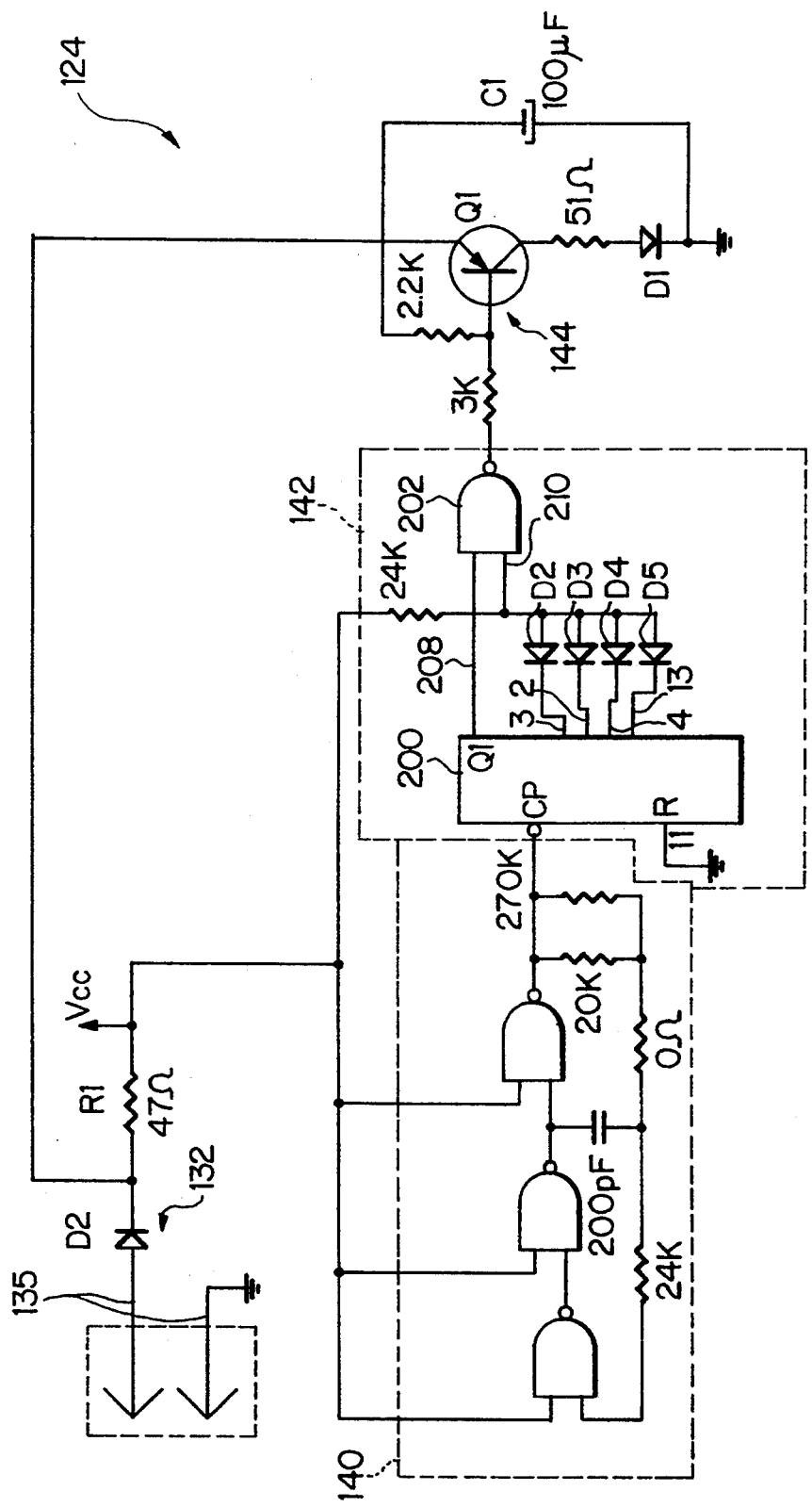
FIG. 10 is a circuit diagram of a preferred implementation of the optical transmitter of FIG. 7.

FIG. 10 is schematic diagram of transmitter 124. In the FIG. 10 implementation, frequency divider 200 is provided by a 12 bit binary counter. The 96 kHz signal is applied to the CP input of frequency divider 200. Also, in the FIG. 10 implementation, voltage regulator 132 includes diode D2, resistor R1, and capacitor C1. This arrangement of voltage regulator 132 provides transmitter 124 with continuous power from lines 135. When the signal over lines 135 is high, capacitor C1 charges. When lines 135 go low, capacitor C1 discharges to maintain power to the other transmitter components. Otherwise, FIG. 10 is self-explanatory.

Figure 11:
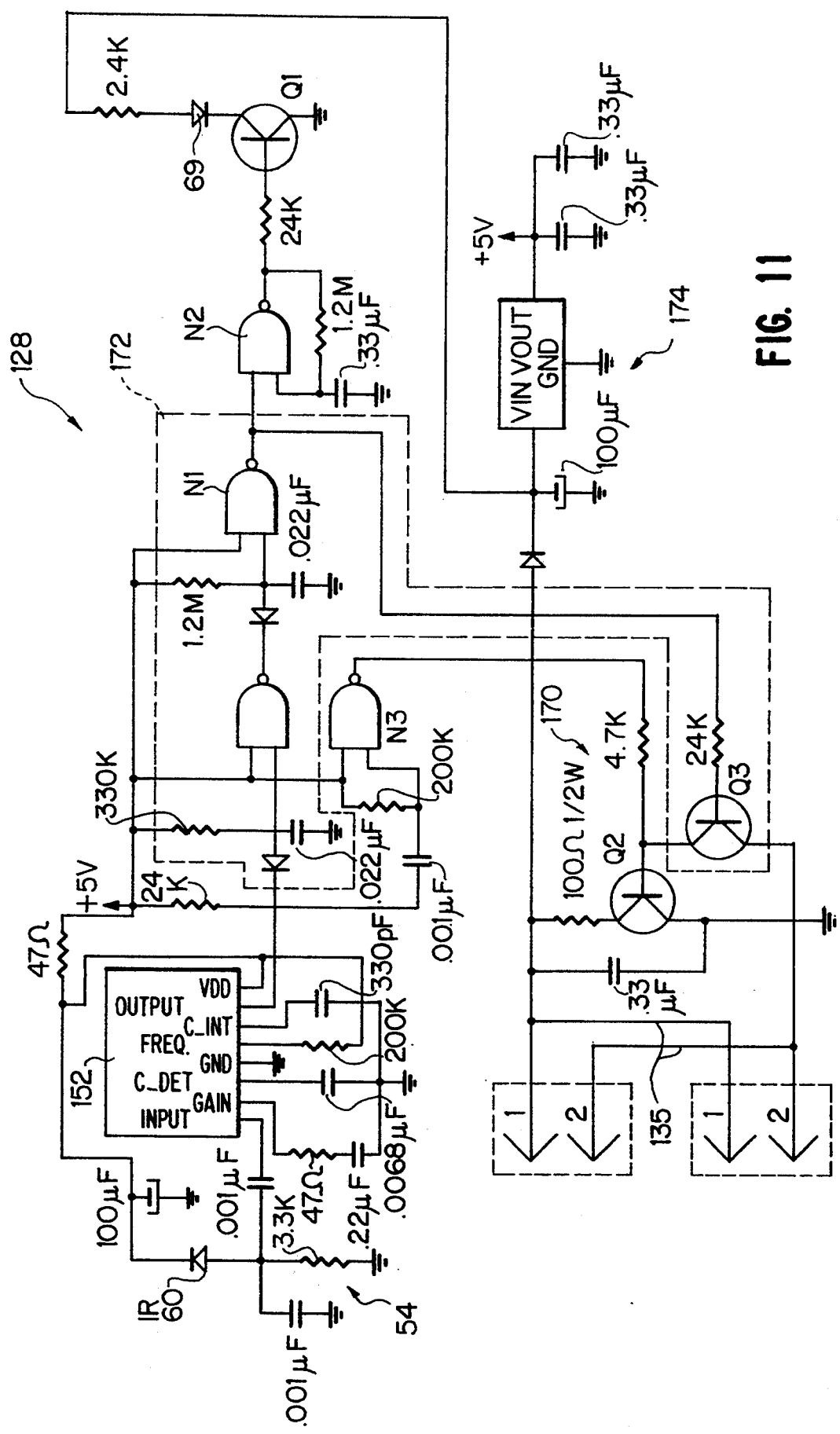
FIG. 11 is a circuit diagram of a preferred implementation of the receiver of FIG. 8.

FIG. 11 shows a preferred implementation of receiver 128. This implementation employs the Sony Corp. TM CX20106A as the integrated circuit detector 152.

Enable circuit 172 includes a one-shot circuit which controls the states of transistors Q1 and Q3. A NAND gate N1 applies an output to the base of transistor Q3 in order to control the state of transistor Q3, and to an input of NAND gate N2 in order to also control the state of transistor Q1, which is the driver for indicator LED 69. During normal operation, in the absence of equipment failure or an obstruction, the output from NAND gate N1 is low. This maintains transistor Q3 in its off state. At the same time, NAND gate N2 receives the low output from NAND gate N1. Gate N2 is arranged such that when it receives a constant low output from gate N1, it applies a constant high output to maintain transistor Q1 conducting. When Q1 conducts, LED 69 remains on. Also, during normal operation, the output at NAND gate N3 is the 375 Hz intelligence signal, which gate N3 normally applies to line buffer transistor Q2 in order to periodically pull down lines 135 to transmit the 375 Hz signal over lines 135.

When receiver 128 fails to detect the signal from transmitter 124, the output from gate N3 remains low whereby transistor Q2 remains off and lines 135 remain high. Also, in the event of an obstruction, the output of gate N1 goes high and thereby biases on transistor Q3. It is understood that this has the effect of ensuring that line buffer transistor Q2 is turned off immediately as transistor Q3 begins to conduct. Transistor Q3 thus is viewed advantageous, but optional. Meanwhile, a constant high output from gate N1 causes gate N2 to intermittently bias transistor Q1 for intermittent operation of diode 69. This provides the visual indication that an obstruction has been detected.

Figure 12:
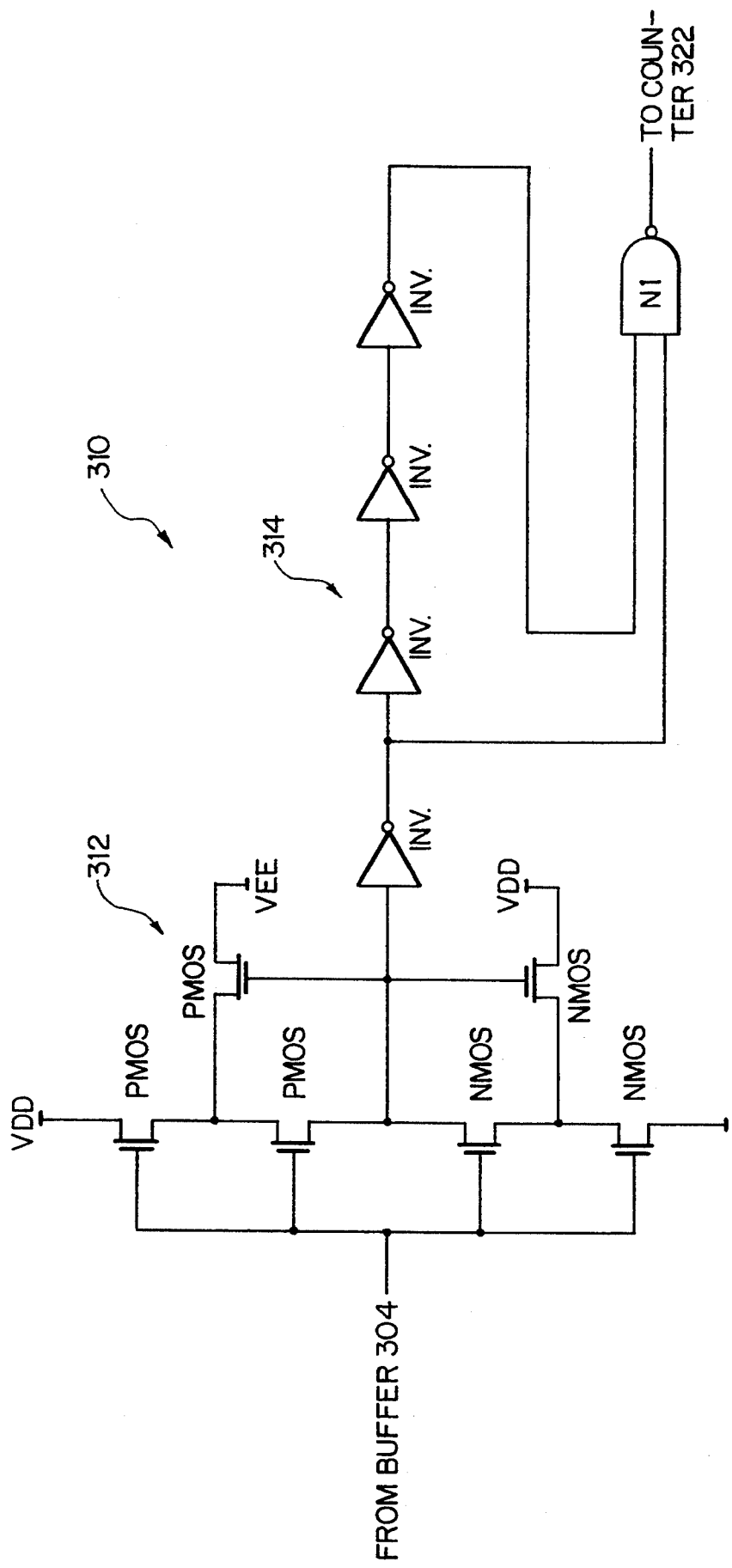
FIG. 12 is a circuit diagram of a preferred implementation of the clock circuit 310 of the door operator controller shown in FIG. 9.
Figure 13:
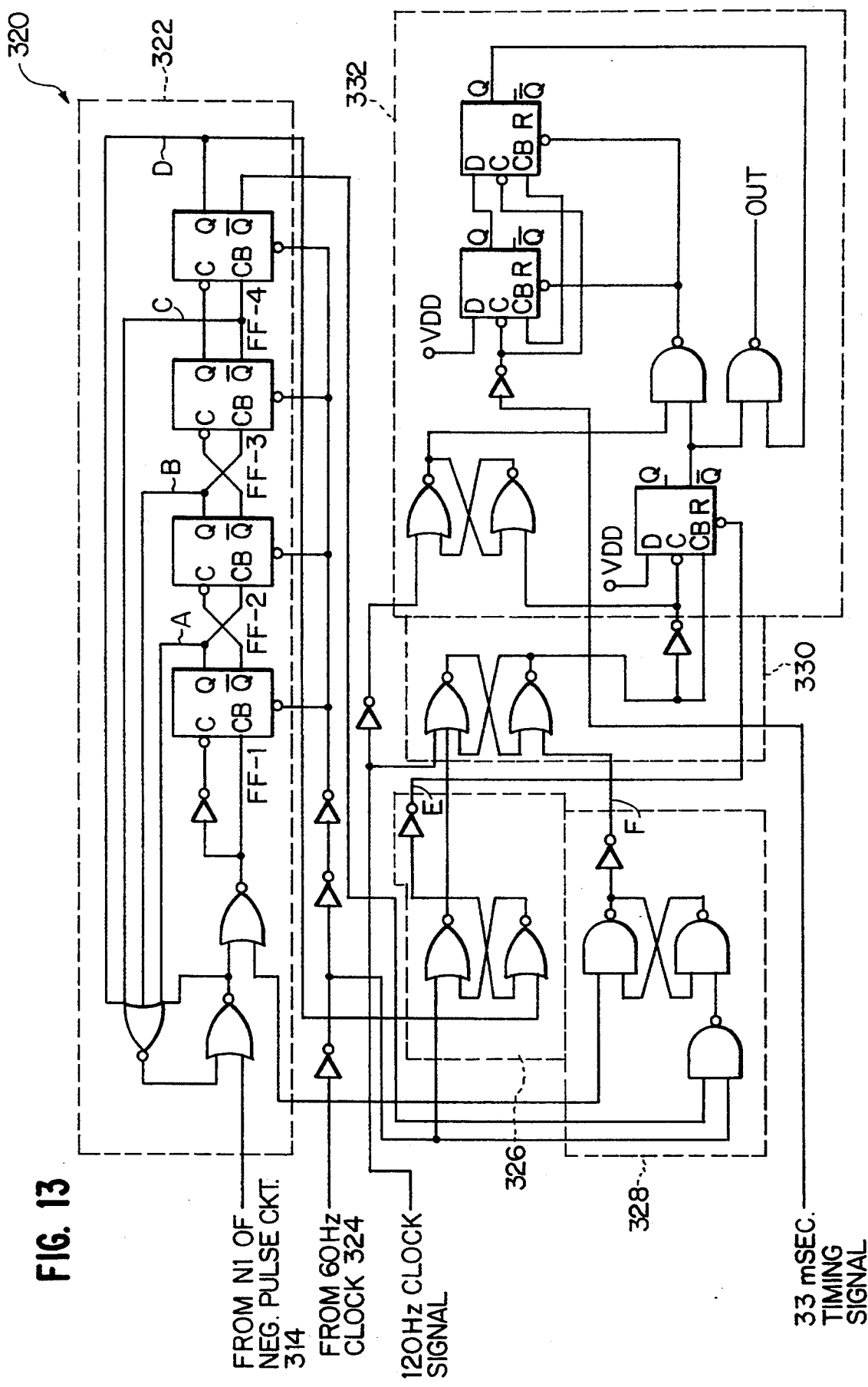
FIG. 13 is a logic diagram of a preferred implementation of the frequency detection logic of the door operator controller shown in FIG. 9.

FIGS. 12 and 13 show a preferred implementation for the clock circuit 310 and frequency detection logic 320 respectively. As seen from FIG. 12, Schmitt trigger circuit 312 is implemented by an array of MOS transistors. Trigger circuit 312 receives input directly from buffer 304. Negative-going pulse conditioner 314 is implemented by the successive inverters and NAND gate N1 shown in FIG. 12.

FIG. 13 is a logic diagram corresponding to a preferred implementation of frequency detection logic 320. In this implementation, counter 322 is arranged to count from binary "0000" to "0100" in the order given by Table 1 below.

| RESET | 0 | 0 | 0 | 0 |
|---|---|---|---|---|
| 1 | 0 | 0 | 0 | 1 |
| 2 | 0 | 0 | 1 | 0 |
| 3 | 0 | 0 | 1 | 1 |
| 4 | 1 | 1 | 0 | 0 |
| 5 | 1 | 1 | 0 | 1 |
| 6 | 1 | 1 | 1 | 0 |
| 7 | 1 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 0 | 1 | 0 | 0 |

Figure 14A:
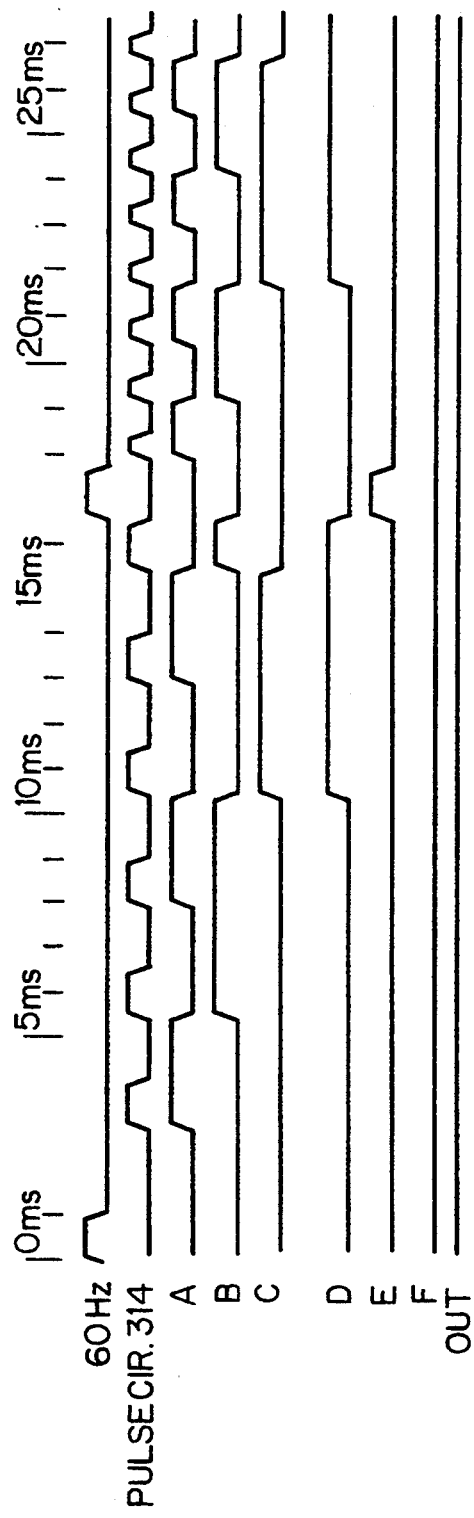
FIGS. 14A and 14B are timing diagrams useful in understanding processing which occurs in the logic shown in FIG. 13.
Figure 14B:
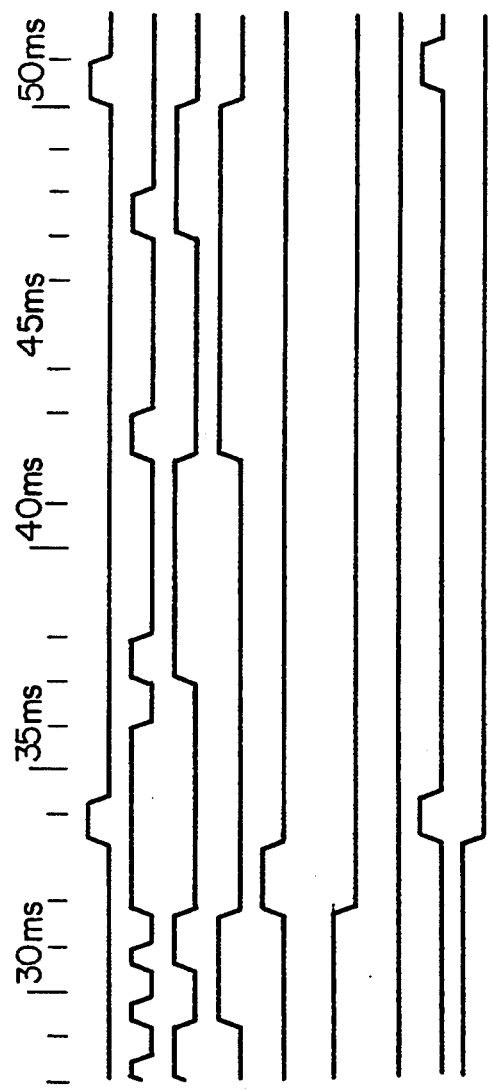

This count sequence is also shown in the timing diagram of FIGS. 14A and 14B. In FIGS. 14A and 14B, waveforms A, B, C, D, E, and F correspond to labeled points A, B, C, D, E, and F in FIG. 13. The inputs from pulse circuit 314 and 60 Hz clock 324 also are indicated. In the timing diagram example, a valid frequency is shown during 0 to 16 microseconds. The next period from 16 microseconds to 32 microseconds shows an input from circuit 314 of more than 11 counts, and the following period exemplifies processing where less than 4 counts has been made.

In counter 322, flip-flops FF-1, FF-2, FF-3, and FF-4 each increment in response to a negative edge applied to their C inputs. As discussed in the foregoing, counter 322 is reset every 16.7 microseconds by the clock signal from clock 324. In the preferred implementation of logic 320, the logic also receives a 120 Hz clock signal which is applied to the error latch 330, and in an inverted form, to the timing and hold logic 332. A 33 millisecond timing signal also is applied to the timing and hold circuit 332. Otherwise, the operation of logic 320 is as described in connection with FIG. 9.

It should be noted that while an optical obstruction detector is described, it would also be possible to practice the invention with other wave based obstruction detectors, such as radio-wave or sound-wave obstruction detectors wherein the wave is coded to distinguish it from error conditions. Also, other means of coding or modulating the control signal could be employed, as long as the detected signal could be distinguished from the signals produced in response to obstructions, wiring errors or malfunctions.

While not the preferred embodiment, it would also be possible to utilize a coded signal with other obstruction detectors. For example, an edge detector with normally-closed switches in series could replace the wave path between the coded signal source and the receiver. This would effectively substitute the direct blocking of a wave by an obstruction for the indirect interruption of the coded signal by the physical operation of the switches. Because the transmitted signal would not be electrically isolated from the receiver, failure or fault detection would suffer, but most conditions would still be detected. In particular, shorts, opens or errors in the wiring between the coded signal source, the receiver and the control signal detector would be detected.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A door operator system comprising:
    control means for controlling the opening and closing of a door across a door threshold;
    a coded wave transmitter for providing a coded wave;
    a wave receiver for providing a coded control signal in response to receipt of said coded wave, the presence of an obstruction in said door threshold preventing said receipt;
    control signal detection means for detecting said coded control signal and providing an "unsafe" signal to said control means if no coded control signal is detected; and
    wiring between said receiver and said detection means, said coded control signal being chosen to differ from a short circuit and an open circuit signal produced by an error or fault in said transmitter, receiver or wiring.

2. A door operator system according to claim 1, wherein said wave is an optical wave.

3. A door operator system according to claim 1, wherein said wave is an infrared wave.

4. A door operator system according to claim 1, wherein said coded wave comprises packets of wave pulses.

5. A door operator system according to claim 1, wherein said control signal detection means comprises means to delay said coded control signal to provide a delayed signal and means to "exclusive or" said coded control signal and said delayed signal to provide said "unsafe" signal.

6. A door operator system comprising:
    control means for controlling the opening and closing of a door across a door threshold, said control means being located remotely from said threshold;
    a coded light beam transmitter located proximately to said threshold, said transmitter providing a coded light beam of packets of light pulses and being powered from said control means, said packets having a period;
    a coded light beam receiver located proximately to said threshold, said receiver providing a control signal having said period when said coded light beam is received by said receiver and being powered from said control means, the presence of an obstruction preventing the receipt of said coded light beam;
    control signal detection means having means to delay said control signal to provide a delayed signal and means to "exclusive or" said control signal and said delayed signal to provide an "unsafe" signal to said control means, said control signal detection means being located proximately to said control means, said control signal detection means, said transmitter and said receiver being powered from said control means; and wiring between said receiver and said control signal detection means, said control signal being chosen to differ from a short circuit and an open circuit signal produced by an error or fault in said transmitter, receiver or wiring.

7. A door operator system for opening and closing a door across a door threshold, said system comprising:

a transmitter for generating an intelligibly encoded signal and transmitting said signal across a door threshold;

a receiver adapted to detect an intelligibly encoded signal transmitted by said transmitter and to provide a representative signal representative of detection of said signal transmitted by said transmitter;

control means, connected to said receiver by wiring, for controlling opening and closing of a door in a manner to at least prevent closure of the door in the absence of a representative signal from said receiver, said control means including a signal detector for detecting the presence or absence of a representative signal from said receiver over said wiring and providing a signal indicative of safe conditions at said threshold when said signal detector detects the presence of a representative signal, and a signal indicative of unsafe conditions at said threshold when said signal detector detects the absence of a representative signal from said receiver over said wiring, and a means for at least preventing closure of the door in response to a signal indicative of unsafe conditions from said signal detector, said representative signal providable by said receiver being different from signals producible by faulty operation of said transmitter, said receiver, and said wiring between said receiver and said control means.

8. A door operator system as claimed in claim 7, wherein said transmitter includes an oscillator for generating a first repetitive signal at a first predetermined frequency, means for generating a second repetitive signal at a second predetermined frequency, means for combining said first and second repetitive signals to provide said intelligibly encoded signal of said transmitter, and means for an optically transmitting said intelligibly encoded signal, and said receiver includes optical receiving means, a detector corrected to said optical receiving means for detecting said second repetitive signal in an intelligibly encoded signal from said transmitter and applying means for applying said second repetitive signal to said control means, over said wiring, as said representative signal of said receiver.

9. A door operator system as claimed in claim 8, wherein said means for generating said second repetitive signal includes a coding oscillator connected to said oscillator for generating said first repetitive signal.

10. A door operator system as claimed in claim 8, wherein said means for generating said second repetitive signal includes a frequency divider means connected to said oscillator, said frequency divider means generating said second repetitive signal based upon said first repetitive signal.

11. A door operator system as claimed in claim 10, wherein said frequency divider means comprises a frequency divider connected to receive said first repetitive signal from said oscillator, a logic gate having a first input connected to an output of said frequency divider, and a diode array connected between at least one other output of said frequency divider and a second input of said logic gate, said frequency divider applying said first repetitive signal to said first input of said logic gate, and said frequency divider and said diode array applying said second repetitive signal to said second input of said gate.

12. A door operator system as claimed in claim 11, wherein said first repetitive signal has a frequency of about 96 kHz and a duty cycle of about 50% and said second repetitive signal has frequency of about 375 Hz and a duty cycle with a high time of about 167 microseconds and a low time of about 2.49 milliseconds.

13. A door operator system as claimed in claim 8, wherein said detector of said receiver includes an integrator.

14. A door operator system as claimed in claim 8, wherein said control means includes a frequency detector for determining whether a signal received over said wiring connecting said control means and said receiver has a frequency within a predetermined permissible frequency range for said representative signal of said receiver.

15. A door operator system as claimed in claim 8, wherein said wiring comprises a two wire cable, said control means providing power to said transmitter and said receiver over said two wire cable.

16. An optical obstruction detection system for a door operator system which includes a door control circuit which connects to said obstruction detection system by wiring, and which regulates opening and closing of a controlled door so as to at least prevent closure of the door by determining whether a signal received from said obstruction detection system, over said wiring, has a frequency within a predetermined frequency range to represent that there is no obstruction present within a protected threshold of the door, said optical obstruction detection system comprising:

a transmitter for transmitting an intelligibly coded optical signal across a door threshold, said transmitter including an oscillator for generating a first repetitive signal at a first predetermined frequency, means for generating a second repetitive signal at a second predetermined frequency within said predetermined frequency range, and means for combining said first and second repetitive signals to provide said intelligibly encoded signal of said transmitter, and a receiver adapted to receive an intelligibly encoded optical from said transmitter, said receiver including a detector for detecting said second repetitive signal of said transmitter, and applying means for applying said second repetitive signal, via said wiring, to a control means of a door operator when said detector detects said second repetitive signal.

17. An optical obstruction detection system as claimed in claim 16, wherein said means for generating said second repetitive signal includes a frequency divider means connected to said oscillator, said frequency divider means generating said second repetitive signal based upon said first repetitive signal from said oscillator.

18. An optical obstruction detection system as claimed in claim 17, wherein said first repetitive signal has a frequency of about 96 kHz and a duty cycle of about 50% and said second repetitive signal has frequency of about 375 Hz and a duty cycle with a high time of about 167 microseconds and a low time of about 2.49 milliseconds.

19. An optical obstruction detection system as claimed in claim 18, wherein said detector of said receiver includes an integrator.

20. An optical obstruction detection system as claimed in claim 16, wherein said wiring comprises a two wire cable, said transmitter and said receiver being adapted to receive power from a control means of a door operator system over said two-wire cable.

* * * * *